(12) United States Patent
Barrett

(10) Patent No.: US 7,580,708 B1
(45) Date of Patent: Aug. 25, 2009

(54) COMPREHENSIVE NETWORK MONITORING AT BROADCAST SATELLITE SITES LOCATED OUTSIDE OF THE BROADCAST SERVICE AREA

(75) Inventor: Ronald C. Barrett, Rancho Palos Verdes, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 443 days.

(21) Appl. No.: 11/222,085

(22) Filed: Sep. 8, 2005

Related U.S. Application Data

(63) Continuation of application No. 10/291,165, filed on Nov. 8, 2002, now Pat. No. 6,965,755.

(51) Int. Cl.
*H04W 4/00* (2006.01)
*H04N 3/02* (2006.01)

(52) U.S. Cl. .................. 455/427; 455/403; 348/180
(58) Field of Classification Search .......... 455/427, 455/12.1, 13.4, 522, 526; 725/36, 107, 125; 375/295, 200; 370/325, 315; 348/180
See application file for complete search history.

(56) References Cited

U.S. PATENT DOCUMENTS

| | | | |
|---|---|---|---|
| 4,207,431 A | 6/1980 | McVoy | |
| 5,758,260 A | 5/1998 | Wiedeman | |
| 6,002,422 A | 12/1999 | Mastenbrook | |
| 6,118,999 A | 9/2000 | Moraes et al. | |
| 6,173,178 B1 | 1/2001 | Hammill et al. | |
| 6,181,932 B1 | 1/2001 | Kolev et al. | |
| 6,212,360 B1 * | 4/2001 | Fleming et al. | 455/13.4 |
| 6,219,528 B1 | 4/2001 | Wright et al. | |
| 6,233,451 B1 | 5/2001 | Noerpel et al. | |
| 6,297,845 B1 | 10/2001 | Kuhn et al. | |
| 6,317,420 B1 * | 11/2001 | Schiff | 370/325 |
| 6,339,611 B1 * | 1/2002 | Antonio et al. | 375/130 |
| 6,473,858 B1 | 10/2002 | Shimomura et al. | |
| 6,493,538 B1 * | 12/2002 | Jabbarnezhad | 455/12.1 |
| 6,526,575 B1 * | 2/2003 | McCoy et al. | 725/36 |
| 6,580,452 B1 * | 6/2003 | Gangitano | 348/180 |
| 6,594,469 B1 * | 7/2003 | Serri et al. | 455/12.1 |
| 6,628,919 B1 | 9/2003 | Curello et al. | |
| 6,704,543 B1 | 3/2004 | Sharon et al. | |
| 6,842,437 B1 | 1/2005 | Heath | |
| 6,920,185 B2 * | 7/2005 | Hinson | 375/295 |
| 2002/0041328 A1 | 4/2002 | LeCompte et al. | |
| 2002/0066102 A1 | 5/2002 | Chapman et al. | |
| 2002/0146979 A1 | 10/2002 | Regulinski et al. | |
| 2003/0005437 A1 | 1/2003 | Feuer et al. | |

* cited by examiner

*Primary Examiner*—Charles N Appiah
*Assistant Examiner*—Kiet Doan

(57) ABSTRACT

A system and method for monitoring the quality of signals transmitted to a remote service area that is located outside of the broadcast area of a main broadcast site. The present invention converts and combines the signals that are to be broadcast from the main broadcast site to a satellite for redistribution to the remote service areas. The converted and combined signals are looped back to a network monitoring operations located at the main broadcast site before being transmitted to the satellite. In another embodiment, the remote broadcast sites send signal strength measurements to the network monitoring operations to provide an indication of satellite transmission problems not related to the quality of the signal being broadcast from the main broadcast site.

10 Claims, 2 Drawing Sheets

COMPREHENSIVE NETWORK MONITORING AT BROADCAST SATELLITE SITES LOCATED OUTSIDE OF THE BROADCAST SERVICE AREA

RELATED APPLICATION

The present application is a continuation of U.S. patent application Ser. No. 10/291,165 filed on Nov. 8, 2002, entitled "Comprehensive Network Monitoring At Broadcast Satellite Sites Located Outside Of The Broadcast Service Area".

TECHNICAL FIELD

The present invention relates generally to network monitoring of a broadcast signal transmission and more particularly to comprehensive network monitoring of a broadcast signal transmission at broadcast sites located outside of a broadcast service area.

BACKGROUND OF THE INVENTION

It is essential that comprehensive network monitoring of the broadcast signal be maintained to provide early detection, troubleshooting and problem resolution. Typically there is an undiminished capability for monitoring a broadcast signal because the information and signals are readily available to the network operations functions as these operations are within the broadcast area. A single, central network monitoring function is provided in the service area.

When the broadcast system has one or more service areas that have locations that do not include the broadcast site, the channels being broadcast cannot be directly received at the service area. A possible solution is to deliver all of the broadcast signals back to the network monitoring function. However, this solution introduces significant cost as the broadcast signals typically have very high bandwidth. Further, there is uncertainty in the quality of the monitoring because the transmission path returning the broadcast signals to the network monitoring function may themselves introduce degradations and outages that do not actually occur in the broadcast itself.

Another possible solution is to create a distributed network monitoring function. Facilities could be provided in each service area. However, the facilities must be staffed twenty-four hours a day in order to perform the network monitoring functions. This is a huge cost burden. Furthermore, the success rate in troubleshooting and resolving problems would most likely be lower due to the complexity of such a distributed organization.

SUMMARY OF THE INVENTION

The present invention is a method of network monitoring of signals within the broadcast site that avoids the problems associated with the prior art. According to the present invention, the broadcast signals that are being transmitted to service areas outside of the broadcast site are looped back into the network monitoring function immediately before being broadcast outside of the site. The use of information and signals are readily available to network operations functions within the broadcast site and undiminished capability for monitoring of a broadcast signal is maintained.

The present invention provides simplicity in that the same program content and management control signals (e.g., program guide signals, conditional access) are integrated into the service broadcasts and are used by the monitoring receivers to access desired channels. To monitor against problems in the transmission from the broadcast site to the service area, a transmission monitoring system at the service area provides signal strength readings to the network monitoring system using a low bandwidth return signal.

It is an object of the present invention to provide comprehensive network monitoring functions for broadcast sites located outside of a broadcast area. It is another object of the present invention to perform network monitoring functions for the broadcast sites, or service areas, located outside of the broadcast area using a network monitoring function within the broadcast site.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
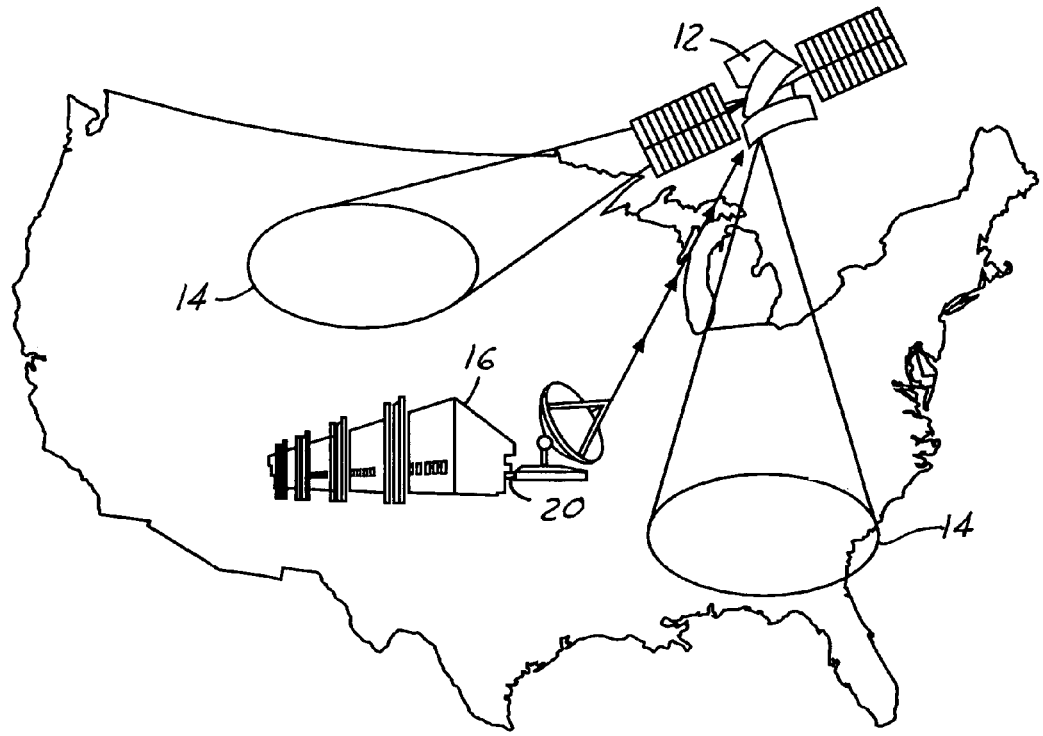
FIG. 1 is an example of a spot beam satellite network utilizing the network monitoring method of the present invention.

FIG. 1 is an example of a spot beam satellite network system 10. A satellite 12 services a plurality of service areas 14. A network monitoring center 16 broadcasts signals to the satellite 12. The satellite 12 redistributes the signals to the plurality of service areas 14 by way of spot beams where the signals for the specific area are received by the intended recipients, i.e. television signals for area subscribers.

The remote service areas are outside of the direct broadcast range of the centralized network monitoring center 16, making it impossible for the network monitoring center 16 to receive the signals being broadcast to the remote service areas 14. According to the present invention, the monitoring function 20 for the remote sites is done at the broadcast site 16 when the signal exits the network monitoring center. The verification of the transmission delivery to the service area is done at the remote site.

Figure 2:
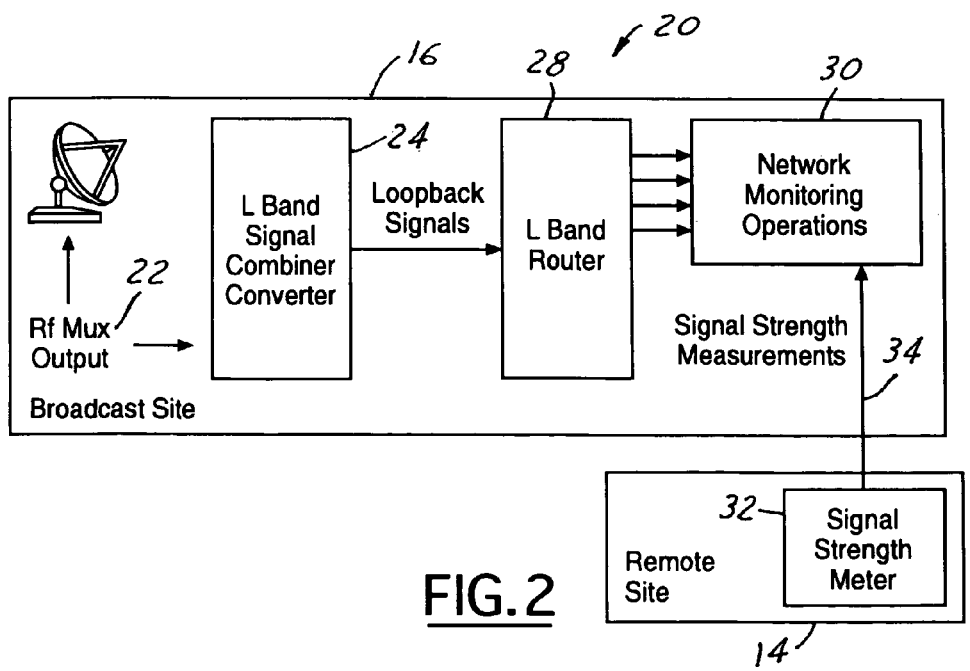
FIG. 2 is a block diagram of the network monitoring function of the present invention.

Referring now to FIG. 2 there is shown a block diagram of the network monitoring function 20 of the present invention. The network monitoring center 16 broadcasts a signal through an RF multiplexer (MUX) output 22 that feeds an uplink antenna. Network monitoring of a high quality output signal in the uplink can validate the content (program content and management control signals) of the transmission in the spot beam downlink unless there is a problem with the satellite transponder, satellite pointing or the uplink antenna is mispointed. These potential problems are addressed by the present invention later herein.

The uplink RF signals are downconverted by a signal converter and optionally combined in a signal combiner 24, an L-band signal converter is shown in FIG. 2 for example purposes. One skilled in the art is capable of substituting like components to accomplish results similar to those of the present invention. The RF signals are downconverted to the frequencies they will occupy in a customer's receiver (not shown) through the spot beam. In one embodiment of the present invention, the downconverted signals are combined into groups that simulate the signals a customer receiver will see in the spot beams. The RF signals are looped back to a signal router 28 to the network monitoring operations 30 where they are monitored for signal quality and content and any necessary adjustments can be made.

When the quality of the outgoing signal is high, the signal that is received by the remote site will also be high quality, unless there is a problem with the satellite transponder, satellite pointing or an uplink problem. As a check for transponder, pointing or uplink problems, the remote areas 14 have a signal strength meter 32 to measure the strength of the signal received from the broadcast center 16. The signal strength measurements 34 are transmitted back to the network monitoring operations 30 where the system can guard against a satellite transponder, pointing or uplink problem. The network monitoring operations 30 has the capability to generate an alert should the signal strength from a remote site degrade. An operator may also be able to bring back and monitor the program content and management control signals from any single channel in a spot beam downlink as a back-up check.

In broadcast video signals, a program guide is used to tune receivers feeding monitors in the network monitoring operations 30. Typically, a complete broadcast signal includes video, audio, data services, program guide and conditional access signals. The signals are broadcast in spot beams. The prior art has the limited capability of monitoring only one of the downlink beams and would require an additional network monitor at the remote site for monitoring capability.

In order to permit use of the program guide to tune receivers feeding monitors in network monitoring operations, the present invention downconverts the uplink RF signals to the L-band frequencies they will occupy in a customer's receiver in the spot beam. The downconverted signals may be combined into groups that simulate all of the signals that subscriber receivers will see in the spot beams.

In another embodiment of the present invention, non-conflicting spot beams may be combined into a superbeam to reduce the number of groups generated in the combiner 26. The superbeam signal can be distributed as needed to monitoring locations within the broadcast site.

The present invention includes the capability to measure the spot beam transponder carrier strength and CONUS transponder carrier strength at the remote area 14. A central computer at the broadcast site 16 monitors signal strength measurements from all of the remote areas 14. A monitoring program is used to continuously analyze the signal strength measurements and raise an alarm upon loss of a signal or degradation of the transponder signal. The system also includes the capability to avoid false alarms due to rain fade. This is facilitated by the comparison of the spot beam transponder signal strength to the signal strength taken from another transponder of a satellite in the same orbital location. Either a spot beam or Conus transponder may be used for this comparison. A Conus transponder is preferred because of its ready availability at all ground or remote locations. The signal strength measurements may be logged in a database to support long term trend analysis of transponder performance.

Figure 3:
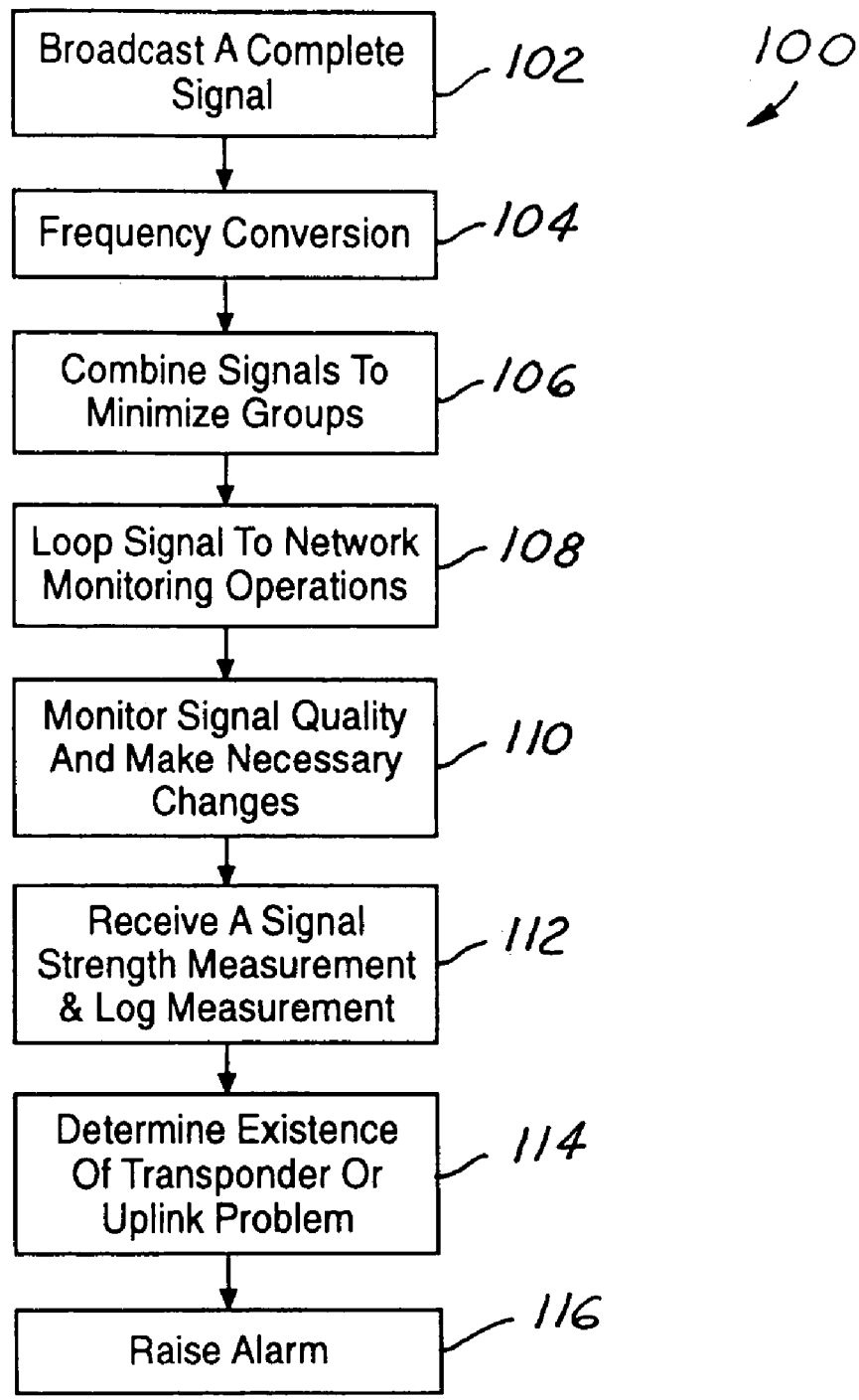
FIG. 3 is a flow chart of the method of the present invention.

The method 100 of the present invention is described with reference to FIG. 3. A broadcast site broadcasts 102 signals to a satellite, where the signals are sent via spot beams to at least one remote service area outside of the broadcast site's range. The signals to be broadcast to the satellite are first converted 104 into the frequencies they will occupy in a customer's receiver in the spot beam. The converted signals may optionally be combined 106 into groups that simulate the signals that the customer will see in the spot beams. Any non-conflicting spot beams may be combined into super beams to reduce the number of signal groups.

The downconverted and combined signal is immediately looped back and routed 108 to a network monitoring operations at the broadcast site where it is monitored 110 for signal quality, program content and management control signals.

For further signal monitoring, a signal strength meter located at the at least one remote site is sending 112 a signal strength measurement to the network monitoring operations at the broadcast site. The signal strength measurement allows the network monitoring operations to determine 114 if there is a problem with the satellite transponder, pointing or uplink.

The monitoring program may continuously analyze the readings and raise an alarm 116 upon loss, or degradation, of a transponder signal. The program also should have the capability to avoid false alarms due to rain fade. In yet another optional step, the signal strength measurements are logged 118 into a database to support long-term trend analysis of spot beam transponder performance.

The invention covers all alternatives, modifications, and equivalents, as may be included within the spirit and scope of the appended claims.

What is claimed is:

1. A system for monitoring signal quality of signals to be broadcast to a satellite and broadcast in spot beams to a service area outside of a broadcast area comprising:
    a broadcast site within a predefined broadcast area, the broadcast site transmits the signals to the satellite and the satellite transmits the signals to the service area foreign to the broadcast;
    a network monitoring operations located at the broadcast site for monitoring signal quality of the signals before the signals are transmitted to a satellite;
    at least one remote site in the service area that receives the signals broadcast by the satellite;
    a signal strength meter at said at least one remote site for measuring a strength of signals to detect problems with the satellite transmission to the foreign service area; and
    means for collecting and monitoring the signal strength measurements at the network monitoring operations;
    wherein the satellite transmits spot beams and the broadcast site further comprises:
    a radio frequency (RF) multiplexer coupled to an unlink antenna transmitting the signals to the satellite;
    a signal converter, coupled to the RF multiplexer to downconvert the signals to frequencies bands upon which the signals are received by customer receivers at the remote site;
    a combiner, coupled to the signal converter, for combining the downconverted signals into groups to simulate the signals received by the customer receivers in the spot beams, further comprising a signal router disposed between the combiner and the network monitoring operations.

2. The system as claimed in claim 1 wherein the means for collecting and monitoring the signal strength measurements further comprises:
    software for analyzing the signal strength measurements; and
    means for raising an alarm upon loss or degradation of the signal.

3. The system as claimed in claim 2 wherein the means for raising an alarm further comprises means for avoiding alarms for signal degradation that is a result of rain fade.

4. The system as claimed in claim 1 further comprising a database for storing signal strength measurements from the at least one remote site thereby providing a history of satellite transponder performance.

5. The system as claimed in claim 4 wherein the database further comprises using data stored in the database to support long term trend analysis of the satellite transponder.

6. The system as claimed in claim 1 wherein the signal strength meter measures the signal strength of a CONUS transponder carrier signals.

7. A method for monitoring a quality of signals broadcast to remote broadcast service areas located outside of a main broadcast area, the remote broadcast service areas having signal strength meters, the main broadcast area having a broadcast site having a network monitoring operations, said method comprising the steps of:

multiplexing, at the broadcast site, the signals to provide the signals to an uplink antenna for transmission to a satellite and to provide the signals to a converter;

converting, at the broadcast site, signals provided to the converter into frequencies upon which the signals received by customer receivers in the remote broadcast service areas;

looping, at the broadcast site, the converted signals provided to the converter to the network monitoring operations;

monitoring a quality of the looped signals at the network monitoring operations to determine if modifications to the signal quality are necessary;

making necessary modifications to the broadcast site to improve the signal quality;

broadcasting a high quality signal to the satellite for spot beam transmission to the remote broadcast service areas after completing the step of making necessary modifications to improve the signal quality;

measuring signal strength at the remote broadcast area;

sending signal strength measurements from the remote broadcast service areas to the network monitoring operations; and determining the existence of a satellite transmission problem from the signal strength measurements received at the network monitoring operations.

8. The method as claimed in claim 7 further comprising the step of logging signal strength measurements into a database at the network monitoring operations.

9. The method as claimed in claim 7 further comprising the step of raising an alarm indicating degradation or loss of the signals based on the signal strength measurements.

10. The method as claimed in claim 9 further comprising the steps of:

determining signal degradation that is a result of rain fade;

preventing the step of raising an alarm for signal degradation that is a result of rain fade.

* * * * *